United States Patent Office 3,637,866
Patented Jan. 25, 1972

3,637,866
SUBSTITUTED PERFLUORO DIPHENYL ETHERS
Ralph J. De Pasquale and Christ Tamborski, Dayton, Ohio, assignors to the United States of America as represented by the Secretary of the United States Air Force
No Drawing. Filed Feb. 13, 1968, Ser. No. 705,024
Int. Cl. C07c *43/02, 65/00, 69/76*
U.S. Cl. 260—612 R        7 Claims

ABSTRACT OF THE DISCLOSURE

Novel perfluorinated diphenyl ethers have at least 8 fluorine substituents and at least one selected substituent, other than fluorine, in the diphenyl ether nucleus. Preferably, the selected substituent is positioned para to the ether linkage. The selected substituents, preferably, are H, Br, Cl, $CF_3$, CN, $COOC_2H_5$, COOH, $C_6F_5$, $C_6F_5$—O—$C_6F_4$, and $C_6F_4$—O—$C_6HF_4$. The products are useful as intermediates for the preparation of monomers for the synthesis of thermally stable polymers containing a fluorophenylether structure. A novel method for making such ethers involves the reaction of an alkali metal fluorophenolate with hexafluorobenzene or a derivative thereof at a temperature of about 100–150° C. and in a solvent selected from the group consisting of dimethylformamide and dimethylacetamide.

The invention described herein may be manufactured and used by or for the United States Government for governmental purposes without payment to us of any royalty thereon.

BACKGROUND OF THE INVENTION

Because of the heat stability of perfluorinated organic compounds, their use has been increasing quite rapidly. Research has centered on attempts to make useful fluorocarbon and fluoro-carbon-oxygen compounds which are counterparts of known hydro-carbon and hydro-carbon-oxygen compounds, respectively. In many of the known perfluorinated compounds, like the known decafluorodiphenyl ether (I), fluorine has completely replaced the hydrogen of such counterparts (e.g. of diphenyl ether). Decafluorodiphenyl ether has found use as an intermediate in the preparation of thermally stable compounds. There is now a need to provide methods to make novel derivatives of such fully fluorinated compounds as decafluorodiphenyl ether wherein a ring position is occupied with a substituent other than fluorine.

OBJECTS

It is an object of this invention to provide perfluoro diphenyl ethers containing at least 8 fluorine substituents and at least one selected substituent, other than fluorine, in the diphenyl ether nucleus and useful as intermediates for the preparation of monomers for the synthesis of thermally stable polymers containing a fluorophenylether structure.

It is also an object to provide a method to make such substituted perfluorodiphenyl ethers.

It is a specific object of the invention to provide such perfluorinated diphenyl ethers with a substituent other than fluorine in the position para to the ether linkage.

We have now found that the foregoing and related objects can be attained in the method which comprises the step of effecting the reaction of (1) a perfluorinated phenolate having the structure

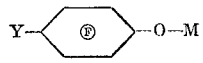

wherein M is an alkali metal and Y is a substituent selected from the group consisting of hydrogen and fluorine with (2) a compound selected from the group consisting of hexafluorobenzene and derivatives thereof wherein a substituent other than fluorine replaces a fluorine substituent, said reaction being effected at a temperature of about 100–150° C. and in a solvent selected from the group consisting of dimethylformamide (DMF) and dimethylacetamide (DMAC). Use of the foregoing method results in the combining of the metal atom (usually sodium) of the phenolate with a fluorine atom of the hexafluorobenzene or derivative thereof. Of importance to the invention is the fact that, under the conditions specified and when the latter reactant is a derivative of hexafluorobenzene containing a selected substituent other than fluorine, the sodium of the phenolate does not combine with the selected substituent (even if it is bromine or chlorine) but most often combines with the fluorine atom positioned para to the selected substituent and less frequently with the fluorine atom positioned ortho or meta to the selected substituent.

When sodium pentafluorophenolate and hexafluorobenzene are reacted by the method of the invention, the product is decafluorodiphenyl ether (I), a compound known to the art. However, when a fluorine atom of the hexafluorobenzene is replaced by a selected substituent other than fluorine and/or when a fluorine atom of the phenolate is replaced by hydrogen, novel perfluorinated diphenyl ethers result wherein there are at least 8 fluorine substituents and at least one said selected substituent in the diphenyl ether nucleus. The latter ethers have the following structure:

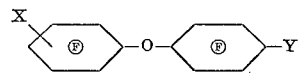

wherein X is a selected substituent other than fluorine and Y is either fluorine or hydrogen. We prefer such ethers wherein X is para to the ether linkage.

We more specifically prefer product compounds wherein there is a selected substituent other than fluorine in a position para to the ether linkage and fluorines in all other positions, as follows:

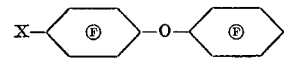

the X being the selected substituent and the Ⓟ indicating that all other ring positions are occupied by fluorine atoms.

Selected substituents of particular value in the compounds of the invention are H, Br, Cl, $CF_3$, CN, $COOC_2H_5$, COOH, $C_6F_5$, $C_6F_5$—O—$C_6F_4$, and $$C_6F_4\text{—O—}C_6HF_4$$

The carboxyl derivative is formed by first making the carboethoxy derivative by the method of the invention and then converting the latter to the carboxyl derivative.

Selected substituents of particular value in the hexafluorobenzene derivatives used as reactants are H, Br, Cl, $CF_3$, CN, $COOC_2H_5$, and $C_6F_5$.

EXPERIMENTAL

All compounds synthesized were characterized by elemental, infrared, and proton-fluorine nuclear magnetic resonance analysis. In certain cases, high resolution mass spectrometry was also used.

The sodium 4-hydrotetrafluorophenolate (II) used in the examples was made as follows: Sodium metal (11.5 grams) was dissolved in 700 ml. of absolute methanol. To the methoxide solution which was cooled to −10° C.

(methanol-ice), 4-hydrotetrafluorophenol (83.0 grams, 0.50 mole) dissolved in 100 ml. methanol was added dropwise with stirring over a one hour period. The temperature was maintained at $-10°$ C. to $0°$ C. The methanol was then removed at a reduced pressure (about 20 mm.) with an aspirator. The white solid that remained was triturated with 300 ml. of chloroform and dried in a vacuum oven (70° C. at 1 mm.) until no further weight loss was observed. The white sodium 4-hydrotetrafluorophenolate had a melting point over 350° C., was soluble in water and most polar organic solvents, and was produced in a yield of 98–100%.

Similarly, sodium pentafluorophenolate (III) was made from pentafluorophenol in a 95–100% yield and had a melting point of 320° C. (dec.).

EXAMPLE 1

Bromopentafluorobenzene (8.4 grams, 0.034 mole) and sodium pentafluorophenolate (3.5 grams, 0.017 mole) were added to 100 ml. of DMAC. The resulting solution was stirred magnetically under nitrogen and heated to 110° C. for about 9 hours. The solution was allowed to cool and was then added to three times its volume of distilled water (exothermic). The resulting aqueous mixture was allowed to attain ambient temperature and settle, the bottom layer yielding a crude product (70% yield) with a melting point of 79–82° C. and comprising 95–98% 4-bromononafluorodiphenyl ether (determined by vapor phase chromatography).

The crude product was purified by column chromatography followed by recrystallization from methyl alcohol to give an analytical sample of melting point 85–86° C. Analysis of the 4-bromononafluorodiphenyl ether (IV) product gave the following percentages: C, 34.98; F, 41.67; and Br, 19.25; as compared to calculated percentages of C, 35.06; F, 41.66; and Br, 19.44.

In order to show the influence of changing certain of the parameters (mole ratio of reactants, solvent, time, and temperature), a series of reactions between bromopentafluorobenzene and sodium pentafluorophenolate was carried out as indicated in the accompanying table.

In DMF, a side reaction incorporating a solvent fragment into the perfluoro-aromatic nucleus competed with the formation of 4-bromononafluorodiphenylether. The compound appears to be 4-N,N-dimethylaminobromotetrafluorobenzene (V). The latter compound was not formed when DMAC was used as the solvent.

The crude reaction mixture, upon vapor phase chromatography, showed three barely separable peaks. The area ratios were 3:97:<1. Separation of the first peak by preparative vapor phase chromatography yielded a colorless viscous oil with an infrared spectrum similar to 4-bromononafluorodiphenyl ether (IV) and with an $F^{19}$ NMR spectrum consistent with the structure of 2-bromononafluorodiphenyl ether (VI). We have speculated, from NMR data, that the third peak indicates the presence of 3-bromononafluorodiphenylether (VII).

High boiling isomeric triphenylethers were also detected in the crude reaction mixture. The triphenylethers can be minimized by using lower reaction temperatures and by using at least a two-fold excess of bromopentafluorobenzene over the sodium pentafluorophenolate used.

EXAMPLE 2

Following the procedure of Example 1, chloropentafluorobenzene (21.2 grams, 0.104 mole) and sodium pentafluorophenolate (11.8 grams, 0.0570 mole) were added to 300 ml. of DMAC. The resulting solution was stirred and heated at 110° C. for about 15 hours. A crude product (12.7 grams, 68% yield) having a melting point of 65–69° C. was isolated and was found by vapor phase chromatography to consist of about 94 percent 4-chlorononafluorodiphenyl ether (VIII) and about 6 percent 2-chlorononafluorodiphenyl ether (IX). Further purification by alumina chromatography and recrystallization from methanol yielded 4-chlorononafluorodiphenyl ether with a melting point of 74–75° C. Analysis of the product gave the following percentages: C, 39.54; F, 46.45; and Cl, 9.90. The calculated percentages are: C, 39.32; F, 46.5; and Cl, 9.67.

EXAMPLE 3

Following the procedure of Example 1, octafluorotoluene (5.15 grams, 0.0218 mole) and sodium pentafluorophenolate (2.24 grams, 0.0109 mole) were stirred and heated in 150 ml. of DMAC for 1.5 hours at 100° C. The crude reaction product (80%) had a melting point of 61–63° C. Purification using alumina chromatography gave an analytical sample of 4-trifluoromethylnonafluorodiphenyl ether (X) with a melting point of 62–63° C. Analysis of the product gave the following percentages: C, 39.15; F. 56.32. The calculated percentages for $C_{13}F_{12}O$ are: C, 39.02; F, 56.98.

EXAMPLE 4

Following the procedure of Example 1, 4-hydroheptafluorotoluene (10.0 grams, 0.0485 mole) and sodium pentafluorophenolate (12.6 grams, 0.0582 mole) were heated in 250 ml. of DMAC at 110° C. for two weeks. The crude product (9.4 grams), a dark oil, was isolated and eluted from alumina to give 8.0 grams of a colorless liquid that was 80% 2-trifluoromethyl-5-hydrooctafluorodiphenyl ether (XI) (as determined by vapor phase chromatography). The product was purified to 96% by distillation (boiling point of 96° C. at 1 mm.). The high resolution mass spectrum of 381.9827 (parent ion) as compared to the calculated value of 381.9851 and of 362.9867 (fragment ion) as compared to the calculated value of 362.9868 supports the formula $C_{13}HF_{11}O$.

EXAMPLE 5

Following the procedure of Example 1, hexafluorobenzene (176 grams, 1.00 mole) and sodium pentafluorophenolate (55.1 grams, 0.250 mole) were stirred and heated in 700 ml. of DMAC at 110° C. for approximately 24 hours. The crude product (59.1 grams, 59% yield) had a melting point of 54–59° C. and was 85% pure. Sublimation of the crude product (65–70° C. at 0.2 mm.) gave a decafluorodiphenyl ether (I) of melting point 70–73° C. The residue was further sublimed (130° C. at 0.2 mm.) to give a white solid with a melting point of 142–150° C. We have speculated that the latter product is a perfluoroterphenyl ether. Analysis of the synthesized decafluorodiphenyl ether showed it to be identical with an authentic sample.

EXAMPLE 6

Following the procedure of Example 1, pentafluorobenzene (11.4 grams, 0.068 mole) and sodium pentafluorophenolate (3.5 grams, 0.017 mole) were heated in 100 ml. of DMAC for two days. The 4-hydrononafluorodiphenyl ether (XII) product, purified by sublimation (25% yield) was a white crystalline solid having a melting point of 54–55° C.

The product was made also from hexafluorobenzene (25.2 grams, 0.136 mole) and sodium 4-hydropentafluorophenolate (7.0 grams, 0.037 mole). These were stirred and heated in 150 ml. of DMAC at 110° C. for 24 hours. The crude product was triturated with petroleum ether (30–60° C.), and the filtrate was eluted from a short alumina column with petroleum ether (30–60° C.). The 4-hydrononafluorodiphenyl ether (36% yield) was recovered from the solvent and had a melting point of 54–56° C. Analysis of the product gave the following percentages: C, 43.35; H, 0.33; and F, 51.58. The calculated percentages for $C_{12}HF_9O$ are: C, 43.39; H, 0.30; and F, 51.49.

EXAMPLE 7

Following the procedure of Example 1, ethylpentafluorobenzoate (33.6 grams, 0.104 mole) and sodium pentafluorophenolate (16.4 grams, 0.052 mole) were heated in 300 ml. DMAC at 110° C. for 2.5 hours. The crude product (88% yield) had a melting point of 45–46° C. Alumina chromatography yielded an analytical sample of 4-carboethoxynonafluorodiphenyl ether (XIII) having a melting point of 46–47° C. Analysis of the product gave the following percentages: C, 44.68; H, 1.30; and F, 41.87. The calculated percentage composition of $C_{15}H_5F_9O_3$ is: C, 44.57; H, 1.25; and F, 42.31.

The ethylpentafluorobenzoate used in this example was prepared as follows: Absolute ethanol (46.0 grams, 1.00 mole) and concentrated sulfuric acid (15.2 grams) were added to a refluxing benzene solution (200 ml.) of pentafluorobenzoic acid (106 grams, 0.500 mole). The mixture was refluxed for 18 hours and then cooled. Diethyl ether (200 ml.) was added and two layers formed. The ether layer was then washed until the water extracts were neutral to litmus, dried over magnesium sulfate, and concentrated to a light yellow fluid (80% yield) which was basically one component (96% as shown by vapor phase chromatography). Distillation (47–48° C., 1 mm.) yielded a colorless ester with a banana-oil odor.

EXAMPLE 8

The 4 - carboethoxynonafluorodiphenyl ether (XIII) product of Example 7 was hydrolysed to the corresponding acid as follows: Sodium hydroxide (0.90 gram, 0.025 mole) dissolved in 20 ml. of water was added to 4-carboethoxynonafluorodiphenyl ether (4.4 grams, 0.011 mole) dissolved in 100 ml. of tetrahydrofuran. The resulting mixture was stirred at room temperature for about 72 hours. The solvent was evaporated, water (50 ml.) was added, and the solution was filtered. The sodium salt of the desired acid (76% yield) was obtained, was dried in a vacuum oven, and had a melting point of 305–308° C. (dec.). The above filtrate was acidified with hydrochloric acid and then extracted with ether (3 × 30 ml.). The extracts were dried over magnesium sulfate and concentrated to a pinkish-white solid. The latter was recrystallized twice from petroleum ether (90–120° C.) to give 0.43 gram (10.5% yield) of an analytical sample of 4-nonafluorodiphenyl ether carboxylic acid (XIV). The sodium salt, described above, was quantitatively converted to the acid by dissolving it in hot water, adding concentrated hydrochloric acid (to pH=1), filtering, and drying. Analysis of the 4-nonafluorodiphenyl ether carboxylic acid gave the following percentages: C, 41.23; H, 0.36; and F, 45.74. The calculated percentage composition of $C_{13}HF_9O_3$ is: C, 41.51; H, 0.27; and F, 45.46.

EXAMPLE 9

Decafluorobiphenyl (155 grams, 0.411 mole) was dissolved in 500 ml. of DMAC under nitrogen. Sodium 4-hydrotetrafluorophenolate (25.8 grams, 0.137 mole) was then added with stirring. The reaction mixture was heated to 100° C. and maintained at that temperature for 15 hours. A sample of the resulting mixture was analysed by vapor phase chromatography and indicated the presence of unreacted decafluorobiphenyl, a small percentage (<2%) of a high boiling component identified as a di-substituted biphenyl, and the desired product 4-(4-hydrotetrafluorophenoxy)-nonafluorobiphenyl (XV). The mixture, when cooled, was added to 1500 ml. of distilled water and the solid that settled was filtered out, dried, and fractionally sublimed (30° C. at 0.5 mm.). The first sublimate consisted of about 90% unreacted decafluorobiphenyl and about 10% of the desired product. The residue from the first sublimation was placed in a flask and heated at reduced pressure (100° C. at 0.3 mm.) to remove the last traces of decafluorobiphenyl. On cooling the residue, 32.0 grams of an off-white solid, melting point 58–60° C., was obtained. A pure white sample, melting point 61–63° C., was obtained by eluting a petroleum ether (30–60° C.) solution of the residue from an alumina column with petroleum ether (30–60° C.). From the first sublimate an additional 9.6 grams of product was obtained by recrystallization from methanol (to remove the decafluorobiphenyl) and further sublimation. The overall yield of 4-(4-hydrotetrafluorophenoxy)nonafluorobiphenyl (XV) was 63%. Analysis of the product gave the following percentages: C, 44.93; and H, 0.26. The calculated percentages for $C_{18}HF_{13}O$ are: C, 45.00; and H, 0.21.

EXAMPLE 10

Example 9 was repeated except that equimolar amounts of decafluorobiphenyl and sodium 4-hydrotetrafluorophenolate were used. This gave rise to a mixture of 4-(4-hydrotetrafluorophenoxy)-nonafluorobiphenyl (XV) and a di-substituted perfluorobiphenyl. The latter, 4,4'-bis(4-hydrotetrafluorophenoxy)-octafluorobiphenyl (XVI) was separated by careful alumina chromatography and had a melting point of 106–108° C. Analysis showed the following percentages: C, 46.03; and H, 0.49. The calculated percentages for $C_{24}H_2F_{16}O_2$ are: C, 46.00; and H, 0.32. A mass spectrum gave the correct molecular weight of 626. The $H^1$ NMR spectrum was exactly the same as that for 4-(4-hydrotetrafluorophenoxy)-nonafluorobiphenyl (XV).

EXAMPLE 11

Decafluorobiphenyl (16.7 grams, 0.050 mole) and sodium pentafluorophenolate (25.88 grams, 0.125 mole) were added to 600 ml. of DMAC in a nitrogen atmosphere, stirred, and heated between 80–90° C. for 140 hours. The cooled reaction mixture was added to 1500 ml. of water and the crude tan colored product that settled was filtered out and dried. The product (27.5 grams) had a melting point of 161–165° C. The aqueous DMAC solution was extracted with chloroform (3 × 100 ml.) and the chloroform extracts were extracted with water (3 × 100 ml.), dried over magnesium sulfate, and evaporated to dryness. The dark residue that remained was triturated with cold methanol and filtered, leaving 3.5 grams of a tan solid with a melting point of 160–165° C. The combined crude products, weighing 31.0 grams, represented a yield of 90.5%. The crude product was dissolved in and eluted from alumina with methylene chloride followed by recrystallization from ethanol-benzene to give an analytical sample of 4,4' - bis(pentafluorophenoxy)octafluorobiphenyl (XVII) with a melting point of 170–171° C. Analysis of the product gave the following percentages: C, 43.44; and F, 51.75. The calculated percentages for $C_{24}F_{18}O_2$ are: C, 43.53; and F, 51.64.

Variation in the starting molar ratio of the reactants leads to the production of some of the mono-substituted compound; that is, 4-pentafluorophenoxy nonafluorobiphenyl (XVIII). The latter has a melting point of 57–59° C.

EXAMPLE 12

Following the procedure of Example 1, cyanopentafluorobenzene (20.0 grams, 0.104 mole) and sodium pentafluorophenolate (10.7 grams, 0.0520 mole) were added to 300 ml. of DMAC. The resulting solution was stirred and heated for 0.5 hour at 100° C. The crude product obtained was triturated with petroleum ether (30–60°) and filtered to remove the inorganic salts. Concentration of the filtrate deposited an off-white solid which was recrystallized from methanol-water to obtain 15.1 grams (82% yield) of 4-cyanononafluorodiphenyl ether (XIX), melting point 61–62° C. Analysis of the product gave the following percentages: C, 43.73; F, 47.62; N, 3.95. The calculated percentages are: C, 43.72; F, 47.88; N, 3.92.

It is to be understood that while specific examples describe preferred embodiments of our invention, they are for the purpose of illustration only, that the products and methods of the invention are not limited to the precise details and conditions disclosed, and that various changes may be made therein without departing from the spirit of the invention which is defined by the following claims.

STRUCTURES OF COMPOUNDS NAMED

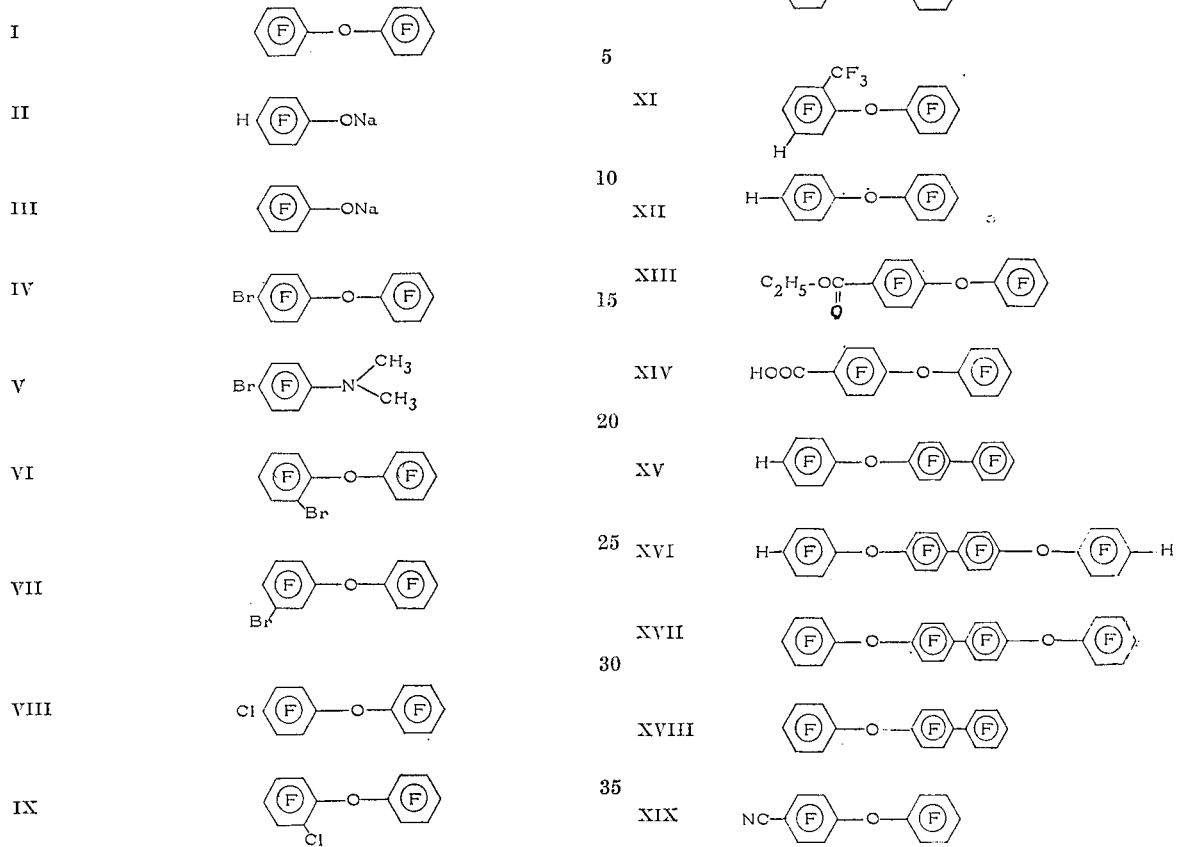

TABLE.—REACTIONS OF SODIUM PENTAFLUOROPHENOLATE WITH BROMOPENTAFLUOROBENZENE

| Mole ratio $C_6F_5Br:C_6F_5ONa$ | Solvent | Temperature, °C. | Time, hours | Percent 4-bromo-nonafluoro-diphenyl ether | Side products |
|---|---|---|---|---|---|
| 1:1 | DMF | 120 | 18 | [1] 25 | V(2%), HBP. |
| 1:1 | DMF | 145 | 20 | Trace | V(24%). |
| 1:3 | DMF | 145 | 4.5 | [2] 2 | Polymer. |
| 3:1 | DMF | 145 | 4.5 | [2] 50 | V(2%). |
| 1:0 | DMF | 145 | 72 | ---------- | V(10%). |
| 1:1 | HBE | 150 | 10 | Trace | |
| 1:1 | HBE | 150 | 10 | Trace | |
| 3:1 | DMAC | 120 | 24 | [1] 40 | HBP [2] (20%). |
| 1:1 | DMAC | 110 | 8 | [1] 74 | HBP [2] (5%). |

[1] = Isolated.
[2] = Estimated by vapor phase chromatography.

NOTE:
HBP = higher boiling products.
HBE = $CH_3OCH_2CH_2OCH_2CH_2OCH_2CH_2OCH_3$

We claim:

1. A method of preparing a perfluorinated diphenyl ether which comprises the step of effecting the reaction of (1) a perfluorinated phenolate having the structure

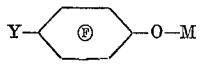

wherein M is an alkali metal and Y is a substituent selected from the group consisting of hydrogen and fluorine with (2) a compound having the structure

wherein X is a substituent selected from the group consisting of H, Br, Cl, $CF_3$, $C_6F_5$, $C_6F_5$—O—$C_6F_4$, and $C_6F_4$—O—$C_6HF_4$, said reaction being effected at a temperature of about 100–150° C. and in a solvent selected from the group consisting of dimethylformamide and dimethylacetamide.

2. The method according to claim 1 wherein said phenolate is an alkali metal pentafluorophenolate.

3. The method according to claim 1 wherein the solvent is dimethylacetamide.

4. The method according to claim 1 wherein the solvent is dimethylacetamide, and the phenolate is sodium pentafluorophenolate.

5. A compound having the formula

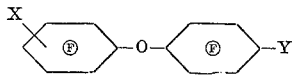

wherein Y is selected from the group consisting of F and H, X is selected from the group consisting of $C_6F_5$, $C_6F_5$—O—$C_6F_4$— and $C_6HF_4$—O—$C_6F_4$— and ⓟ indicates that all other ring positions are occupied by fluorine atoms.

6. The perfluorinated diphenyl ether of claim 5 which is 4-(4-hydrotetrafluorophenoxy)-nonafluorobiphenyl.

7. The perfluorinated diphenyl ether of claim 5 which is 4,4′ - bis(4 - hydrotetrafluorophenoxy) - octafluorobiphenyl.

References Cited

UNITED STATES PATENTS 3,251,890   5/1966   Hazeldine et al. ____ 260—612

OTHER REFERENCES

De Pasquale et al., Chem. Abstr. 67: 108083b (1967).
De Pasquale et al., Chem. Abstr. 68: 104689b (1968).

LORRAINE A. WEINBERGER, Primary Examiner
R. S. WEISSBERG, Assistant Examiner

U.S. Cl. X.R.

260—465 F, 473 G, 520, 613 R